(12) United States Patent
Brueck et al.

(10) Patent No.: US 8,050,683 B2
(45) Date of Patent: Nov. 1, 2011

(54) METHOD OF DETERMINING WHEN A MOBILE STATION IS READY TO BE SERVED DURING A HANDOFF IN A WIRELESS COMMUNICATIONS NETWORK

(75) Inventors: Stefan Brueck, Nuremburg (DE); Francis Dominique, Rockaway, NJ (US); Hongwei Kong, Denville, NJ (US); Walid Elias Nabhane, Bedminster, NJ (US)

(73) Assignee: Alcatel Lucent, Paris (FR)

( * ) Notice: Subject to any disclaimer, the term of this patent is extended or adjusted under 35 U.S.C. 154(b) by 1294 days.

(21) Appl. No.: 11/645,602

(22) Filed: Dec. 27, 2006

(65) Prior Publication Data

US 2008/0161003 A1 Jul. 3, 2008

(51) Int. Cl.
*H04W 36/00* (2009.01)
(52) U.S. Cl. .................... 455/438; 370/332
(58) Field of Classification Search ............. 455/438
See application file for complete search history.

(56) References Cited

U.S. PATENT DOCUMENTS

| | | | | |
|---|---|---|---|---|
| 6,449,481 | B1 * | 9/2002 | Kwon et al. | 455/437 |
| 2006/0198340 | A1 * | 9/2006 | Murata et al. | 370/331 |
| 2006/0281461 | A1 * | 12/2006 | Kwun et al. | 455/436 |
| 2007/0287382 | A1 * | 12/2007 | Catreux-Erceg et al. | 455/63.1 |

FOREIGN PATENT DOCUMENTS

WO WO 2006063842 A1 * 6/2006

* cited by examiner

*Primary Examiner* — Rafael Pérez-Gutiérrez
*Assistant Examiner* — Munjalkumar Patel
(74) *Attorney, Agent, or Firm* — Harness, Dickey & Pierce, P.L.C.

(57) ABSTRACT

A method of determining handoff of a user equipment (UE) to a transferee serving station from a transferor serving station at the transferee serving station is provided. The transferee serving station (e.g., a Node B) measures an energy level in a first portion of an uplink channel (e.g., an uplink high-speed dedicated physical control channel (HS-DPCCH)), the first portion of the uplink channel associated with the transferee serving station. In an example, the first portion of the uplink channel is where a channel quality indicator (CQI) is expected to be reported from the UE for the transferee serving station. The transferee serving station also measures an energy level in a second portion of the uplink channel, the second portion of the uplink channel associated with the transferor serving station. In an example, the second portion of the uplink channel is where a CQI is expected to be reported from the UE for the transferor serving station. The transferee serving station then determines when the UE has handed off to the transferee serving station based upon the measured energy levels.

20 Claims, 9 Drawing Sheets

METHOD OF DETERMINING WHEN A MOBILE STATION IS READY TO BE SERVED DURING A HANDOFF IN A WIRELESS COMMUNICATIONS NETWORK

BACKGROUND OF THE INVENTION

1. Field of the Invention

Example embodiments of the present invention relate generally to a method of determining when a mobile station is ready to be served during a handoff in a wireless communications network.

2. Description of the Related Art

A cellular communications network typically includes a variety of communication nodes coupled by wireless or wired connections and accessed through different types of communications channels. Each of the communication nodes includes a protocol stack that processes the data transmitted and received over the communications channels. Depending on the type of communications system, the operation and configuration of the various communication nodes can differ and are often referred to by different names. Such communications systems include, for example, a Code Division Multiple Access 2000 (CDMA2000) system and Universal Mobile Telecommunications System (UMTS).

UMTS is a wireless data communication and telephony standard which describes a set of protocol standards. UMTS sets forth the protocol standards for the transmission of voice and data between a base station (BS) or Node B and a mobile or User Equipment (UE). UMTS systems typically include multiple radio network controllers (RNCs). The RNC in UMTS networks provides functions equivalent to the Base Station Controller (BSC) functions in GSM/GPRS networks. However, RNCs may have further capabilities including, for example, autonomously managing handovers without involving mobile switching centers (MSCs) and Serving General Packet Radio Service (GPRS) Support Nodes (SGSNs). The Node B is responsible for air interface processing and some Radio Resource Management functions. The Node B in UMTS networks provides functions equivalent to the Base Transceiver Station (BTS) in GSM/GPRS networks. Node Bs are typically physically co-located with existing GSM base transceiver station (BTS) to reduce the cost of UMTS implementation and minimize planning consent restrictions.

Figure 1:
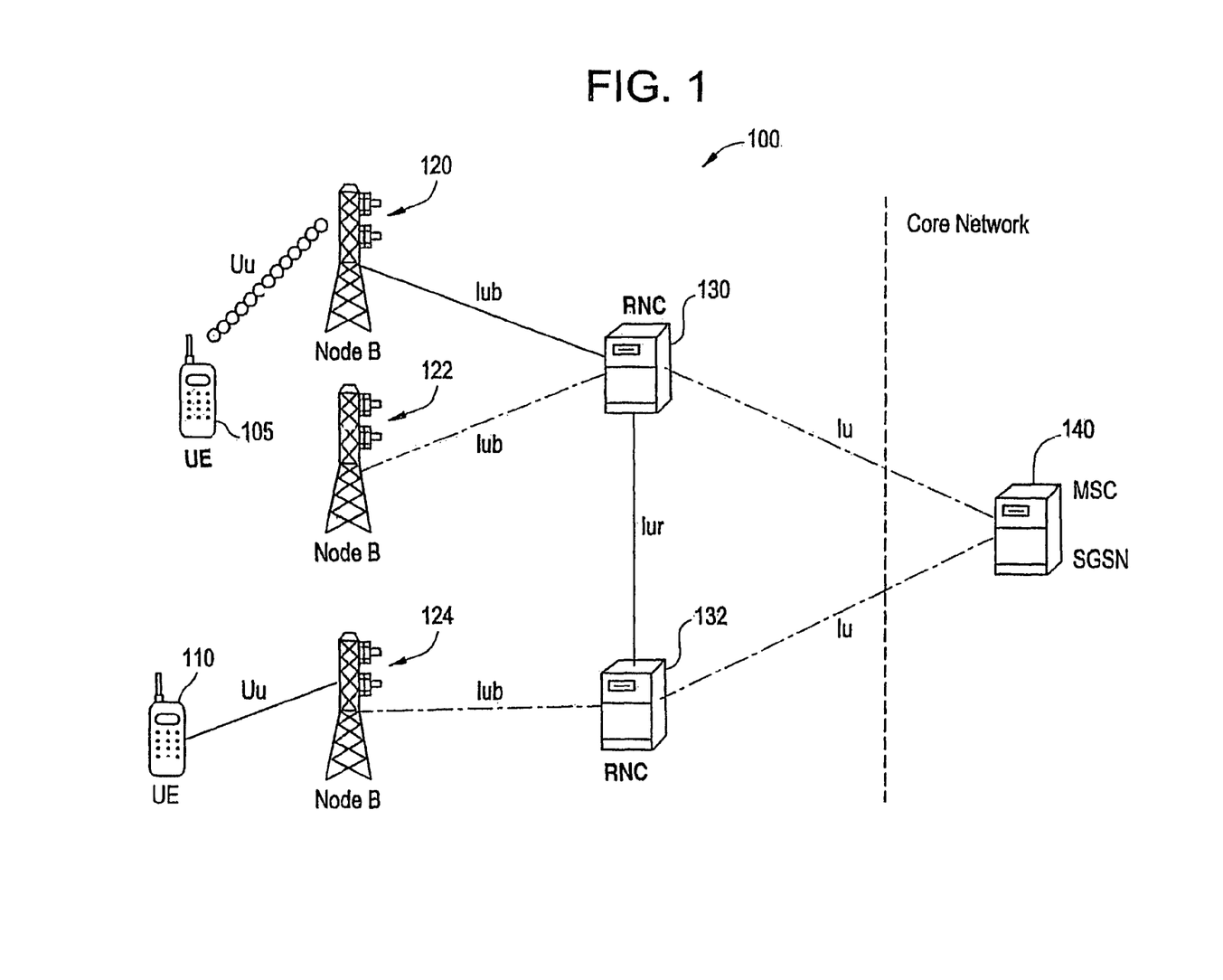
FIG. 1 illustrates a conventional communication system operating in accordance with Universal Mobile Telecommunications System (UMTS) protocols.

FIG. 1 illustrates a conventional communication system 100 operating in accordance with UMTS protocols. Referring to FIG. 1, the communication system 100 may include a number of Node Bs such as Node Bs 120, 122 and 124, each serving the communication needs of UEs such as UEs 105 and 110 in their respective coverage area. The Node Bs are connected to an RNC such as RNCs 130 and 132, and the RNCs are connected to a MSC/SGSN 140. The RNC handles certain call and data handling functions, such as, as discussed above, autonomously managing handovers without involving MSCs and SGSNs. The MSC/SGSN 140 handles routing calls and/or data to other elements (e.g., RNCs 130/132 and Node Bs 120/122/124) in the network or to an external network. Further illustrated in FIG. 1 are conventional interfaces Uu, Iub, Iur and Iu between these elements.

Third generation wireless communication protocol standards (e.g., 3GPP-UMTS, 3GPP2-CDMA, etc.) may employ a dedicated traffic channel in the uplink (e.g., a communication flow between a mobile station (MS) or UE and a base station (BS) or Node B). The dedicated traffic channel may include a data part (e.g., a dedicated physical data channel (DPDCH) in accordance with UMTS protocols, a fundamental channel or supplemental channel in accordance with CDMA2000 protocols, etc.) and a control part (e.g., a dedicated physical control channel (DPCCH) in accordance with UMTS protocols, a pilot/power control sub-channel in accordance with CDMA2000 protocols, etc.).

High Speed Downlink Packet Access (HSDPA) is introduced in Release 5 of the third generation wireless standards for 3GPP-UMTS. To achieve high-speed data transmissions, two new channels in the downlink are introduced; namely, a high speed shared control channel (HS-SCCH) and a high speed downlink shared channel (HS-DSCH). The HS-SCCH carries the control information for the HS-DSCH (the actual packet data). The HS-DSCH is transmitted using a high speed physical downlink shared channel (HS-PDSCH). The HS-SCCH and HS-PDSCH for one cell (e.g., one of Node Bs 120, 122, 124, etc.) are shared by all HSDPA users (e.g., UE 105, UE 110, etc.) in that cell. A Node B scheduler (e.g., for one of Node B 120, Node B 122, Node B 124, etc.) decides which UE (e.g., UE 105/110) to transmit to, a given amount of data to transmit, a given power level for the transmission and a given modulation/coding format for the transmission based on a number of factors, such as an instantaneous downlink quality, quality of services (QoS) requirements, etc. After the Node B scheduler determines the parameters for the transmission, the transmission is scheduled. The data format as well as user identification information is carried in the HS-SCCH that accompanies the HS-PDSCH.

Knowledge of real-time downlink channel quality at the Node B scheduler may affect the efficiency of a HSDPA system. In the current UMTS-HSDPA standards, the downlink channel quality is determined by measuring the channel quality at the UE of the serving cell (e.g., UE 105, UE 110, etc.) and having the UE report the measured channel quality to the Node B (e.g., Node B 120, Node B 122, Node B 124, etc.) through a code channel in the uplink. The uplink code channel is a newly introduced high speed dedicated physical control channel (HS-DPCCH). The HS-DPCCH is introduced in Release 5 of the third generation wireless standards for 3GPP-UMTS to support HSDPA operations and may carry acknowledgment (ACK) and negative ACK (NACK) signals as well as a channel quality indicator (CQI) signal. The measured channel quality may be quantized (e.g., to a 5 bit binary number) at the UE to generate the CQI signal. The CQI is capable of representing thirty (30) different levels of channel quality (e.g., $2^5=32$, with "00000" serving as an out-of-range indicator and "11111" being reserved). Generally, the CQI signal or "word" is coded using a (20, 5) second order Reed Muller code (e.g., so the new 20 bit words are separated by a bigger minimum Hamming Distance) while the ACK and NACK signals are simple repetition codes. At the Node B, the CQI signal may be converted into a channel quality metric, for example a common pilot channel (CPICH) carrier-to-noise ratio (Ec/Nt).

For stationary or very low mobility (e.g., slow moving) UEs, the Node B scheduler may use the CPICH Ec/Nt as a measure of the UE's current channel quality because the UE is moving slowly and the CPICH Ec/Nt may approximate the UE's current channel quality. However, as mobility or speed of the UE increases, the CPICH Ec/Nt may be less likely to function as an accurate indicator of the UE's current channel quality. For example, some wireless communication systems have a latency of 9 milliseconds (ms), which means the Node B scheduler is using a value for the CPICH Ec/Nt that is approximately 9 ms older than a current CPICH Ec/Nt.

SUMMARY OF THE INVENTION

An example embodiment of the present invention is directed to a method of determining handoff of a user equipment (UE) to a transferee serving station from a transferor serving station at the transferee serving station, including first measuring an energy level in a first portion of an uplink channel, the first portion of the uplink channel associated with the transferee serving station, second measuring an energy level in a second portion of the uplink channel, the second portion of the uplink channel associated with the transferor serving station and determining when the UE has handed off to the transferee serving station based upon the first and second measured energy levels.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION OF EXAMPLE EMBODIMENTS

In order to better understand the present invention, an example of a conventional uplink frame structure for a UMTS wireless communication system and an example communication flow diagram of a conventional downlink channel quality reporting will be described, followed by descriptions of example processes of estimating when a given UE switches from a current serving base station to a next serving base station during a handoff based on a comparison of measured energy levels where channel quality reporting is expected for the current serving base station and the next serving base station.

Conventional UMTS Uplink Frame Structure

Figure 2:
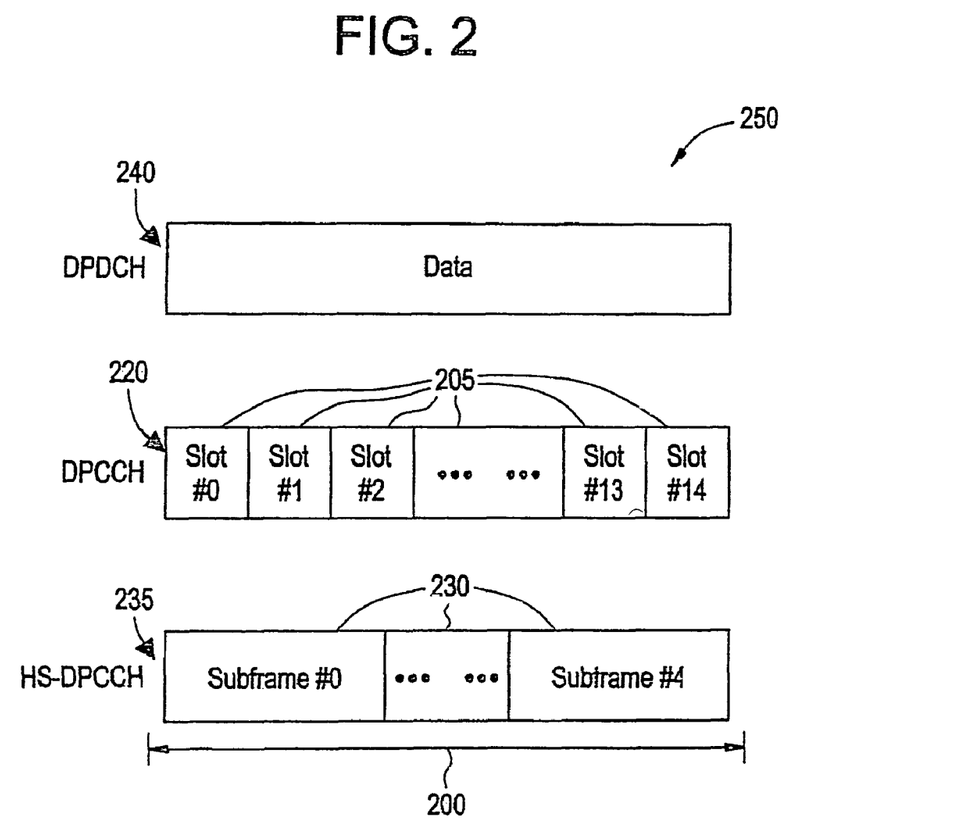
FIG. 2 illustrates an example of a frame of a UMTS uplink dedicated traffic channel including a high speed dedicated physical control channel (HS-DPCCH).

FIG. 2 illustrates an example of a frame 200 of a UMTS uplink dedicated traffic channel 250 including a DPDCH 240, a DPCCH 220 and a high speed dedicated physical control channel (HS-DPCCH) 235. Each frame 200 may have a length of, for example, 10 milliseconds (ms) and, for the DPCCH 220, may be partitioned into a plurality of slots 205 (e.g., 15 slots). Each slot 205 may have a length of, for example, 2560 chips, which may correspond to one power-control period, and may have a duration of, for example ⅔ ms. The DPCCH 220 will be described in further detail below with respect to FIG. 3.

Each of the DPCCH 220 and the DPDCH 240 may be code multiplexed. The DPDCH 240 may include information transmitted from a mobile station or user equipment (UE). The HS-DPCCH 225 may include a plurality of subframes 230 within the frame 200. Each subframe 230 in the HS-DPCCH may correspond to a plurality of slots 205 in the DPCCH.

Figure 3:
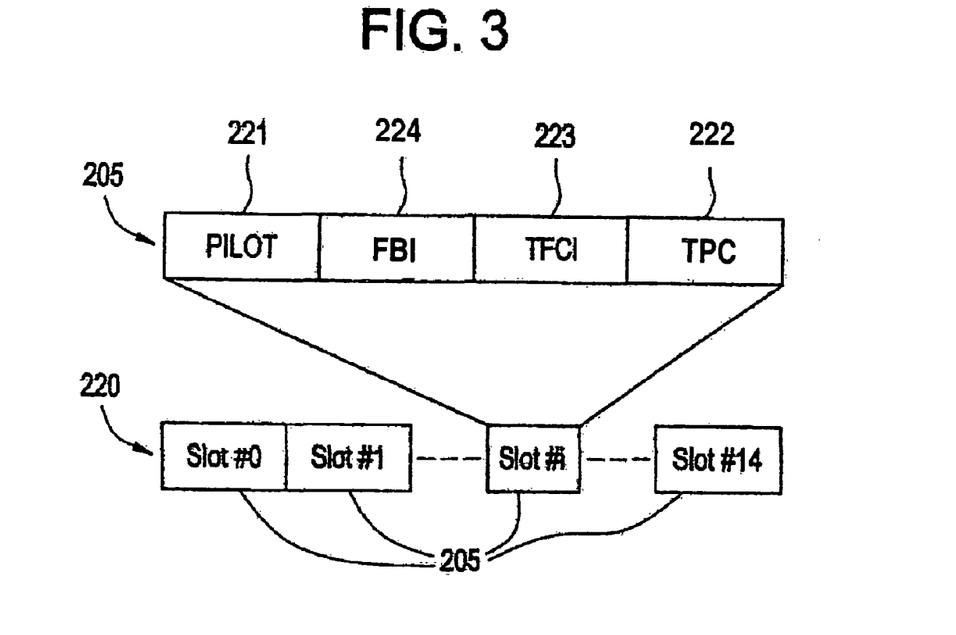
FIG. 3 illustrates an example slot structure for a given slot of a DPCCH.

FIG. 3 illustrates an example slot structure for a given slot 205 of the DPCCH 220. Each slot 205 in the frame 200 of the DPCCH 220 may include control information, for example, a pilot signal 221, a transmit power control (TPC) command 222, transport format combination indicator (TFCI) bits 223 and feedback information (FBI) 224.

In an example, each slot 205 may include a total of 10 bits, with a given number of pilot bits (e.g., pilot signal 221) and control bits (e.g., a combination of TPC bits in the TPC command 222, TFCI bits 223 and FBI bits 224). In a further example, each slot 205 may include 10 bits with 5 pilot bits, 2 TFCI bits, 1 FBI bit and 2 TPC bits. However, the number of total bits for each slot 205 as well as the bit composition of each slot 205 (e.g., other numbers of TFCI bits, FBI bits, pilot bits, TPC bits, etc.) may vary and may be controlled by a RNC (e.g., RNC 130, RNC 132, etc.).

The TFCI 223 may inform a Node B of the transport format of information (e.g., voice and/or data packets, frames, etc.) transmitted from a UE.

Each of the UE and the Node B may generate and transmit TPC bits in the TPC command 222 of the uplink DPCCH 220 and the downlink DPCCH (not shown), respectively, to control each others transmit power.

In an example, each slot 205 in the frame 200 may include a TPC command 222 with either 1 or 2 TPC bits. If a given slot 205 includes 2 TPC bits, the values for each of the 2 TPC bits may be identical; namely, the TPC bits in the TPC command 222 are either both "0" or both "1", given as "00" and "11", respectively. The TPC bits in the TPC command 222 may be used to adjust the downlink transmit power in order to converge the downlink transmit power to a desired target power. For example, if the TPC bits in the TPC command 222 are "0" or "00", the downlink transmit power may be decreased. In another example, if the TPC bits in the TPC command 222 are "1" or "11", the downlink transmit power may be increased.

While FIGS. 2 and 3 illustrate a 3GPP-UMTS uplink frame structure, a 3GPP2-UMTS uplink frame structure may be similar. However, a typical 3GPP2-UMTS uplink frame structure does not include the above-described TFCI 223 and FBI 224.

Figure 4:
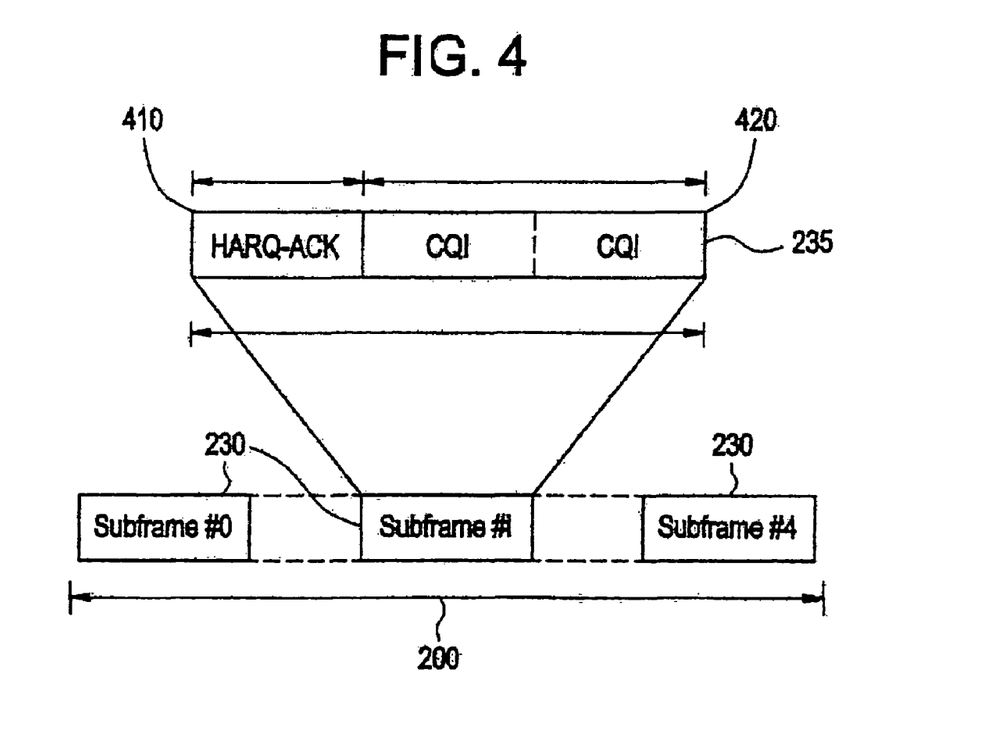
FIG. 4 illustrates a given subframe of a HS-DPCCH.

FIG. 4 illustrates a given subframe 230 of the HS-DPCCH 235. In the example where each frame 200 has a duration of 10 ms, each subframe 230 of the HS-DPCCH 235 may have a duration of 2 ms, which may be equivalent to 3 slots 205 for the DPCCH 220, where each slot 205 has a duration of ⅔ ms. Each subframe 230 may include a hybrid automatic request (HARQ)-acknowledgment (ACK) 410 and a channel quality indicator (CQI) 420. In an example, the HARQ-ACK 410 may be allotted 2560 chips (e.g., corresponding to a first slot 205 of the subframe 230) and the CQI 420 may be allotted 5120 chips (e.g., corresponding to second and third slots 205 of the subframe 230).

The CQI 420 may be reported once for each subframe 230, for example at an end of a given subframe 230 for which the CQI 420 is being reported. Thus, a highest rate that a UE may transmit the CQI 420 to a Node B may be once for every 3 slots 205 (e.g., 2 ms). However, to conserve UE battery power, 3GPP-UMTS standards allow the CQI 420 to be transmitted at a lower rate, for example every 80 subframes 230 or 240 slots 205.

Conventional Downlink Channel Quality Reporting

Figure 5:
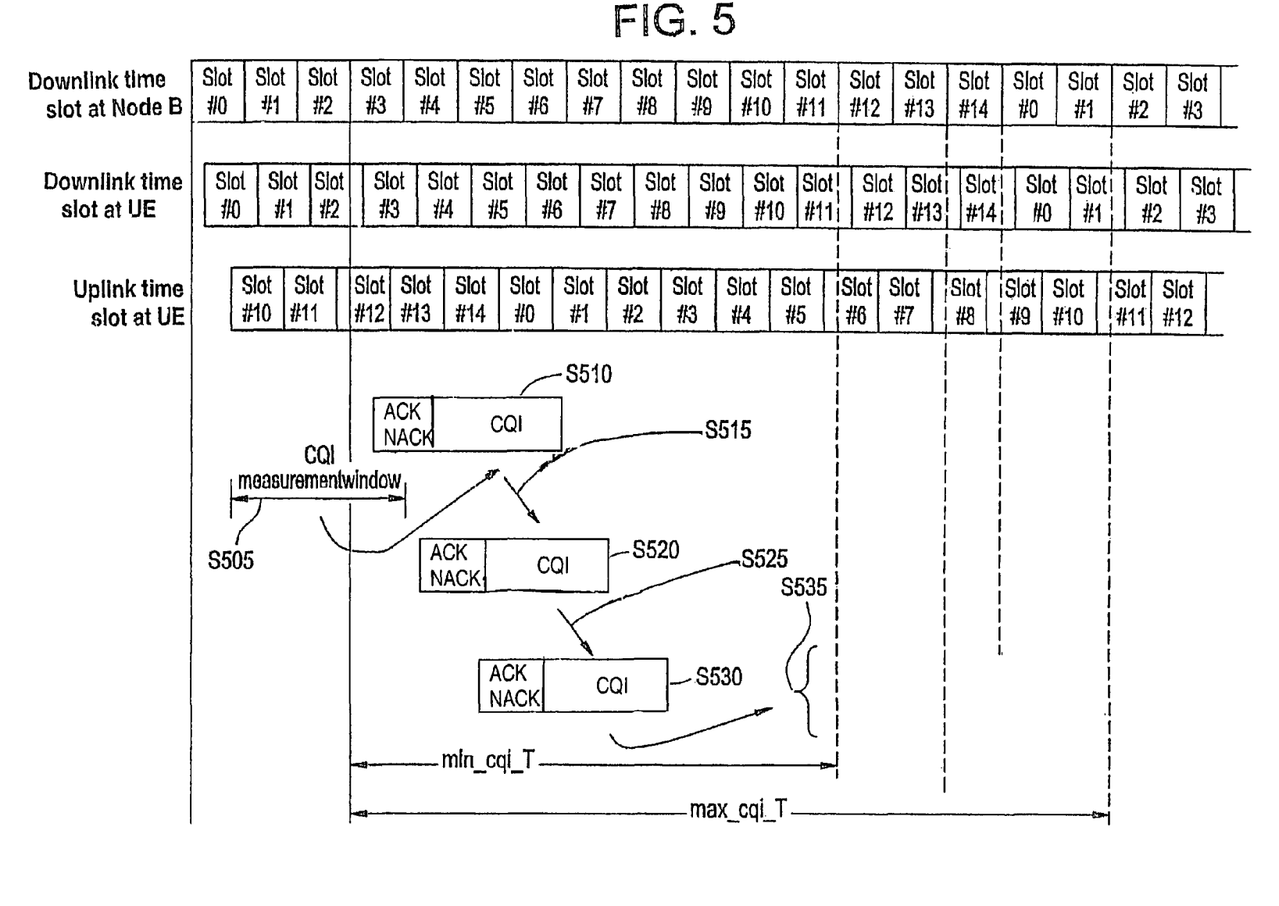
FIG. 5 illustrates a communication diagram of conventional channel quality indicator (CQI) reporting.

FIG. 5 illustrates a communication diagram of conventional CQI 420 reporting.

Channel quality at a given UE (e.g., UE 105, UE 110, etc.) is measured (at S505) in a CQI measurement window. After the channel quality is measured (at S505), the given UE converts the measured channel quality into the CQI 420 and transmits (at S510) the CQI 420 for representing the measured channel quality to a Node B (e.g., Node B 120, Node B 122, Node B 124, etc.). The CQI 420 experiences propagation delay (at S515) during transmission from the UE to the Node B and arrives at the Node B at a later time than it was initially transmitted by the given UE. The Node B receives the CQI 420 (at S520) and transfers the CQI 420 to the Node B scheduler, where the CQI 420 experiences a processing delay (at S525) during the transfer. The Node B scheduler receives the CQI 420 (at S530) and schedules an adjustment to downlink power (e.g., HS-SCCH power and/or selects an MCS for the HS-PDSCH) for transmissions from the Node B to the given UE based on the received CQI 420. The scheduled adjustment to the downlink power may take effect at a next downlink transmission (at S535). A given time lapse occurs between the measurement of the channel quality (at step S505) and the scheduled adjustment to the downlink power (at S535), where the given time lapse is at least min_CQI_T and no more than max_CQI_T. In an example, the min_CQI_T may be approximately 4.5 subframes (e.g., 9 ms) or 13.5 slots. Various factors such as the propagation/processing delays of steps S515 and S525 may affect the min_CQI_T.

The above-described delays in the reporting of the CQI 420 may cause the downlink power to be adjusted based on older and/or inaccurate information at the Node B scheduler, for example in a situation where the channel quality at the UE changes rapidly (e.g., if the UE is moving at a high speed).

Figure 6:
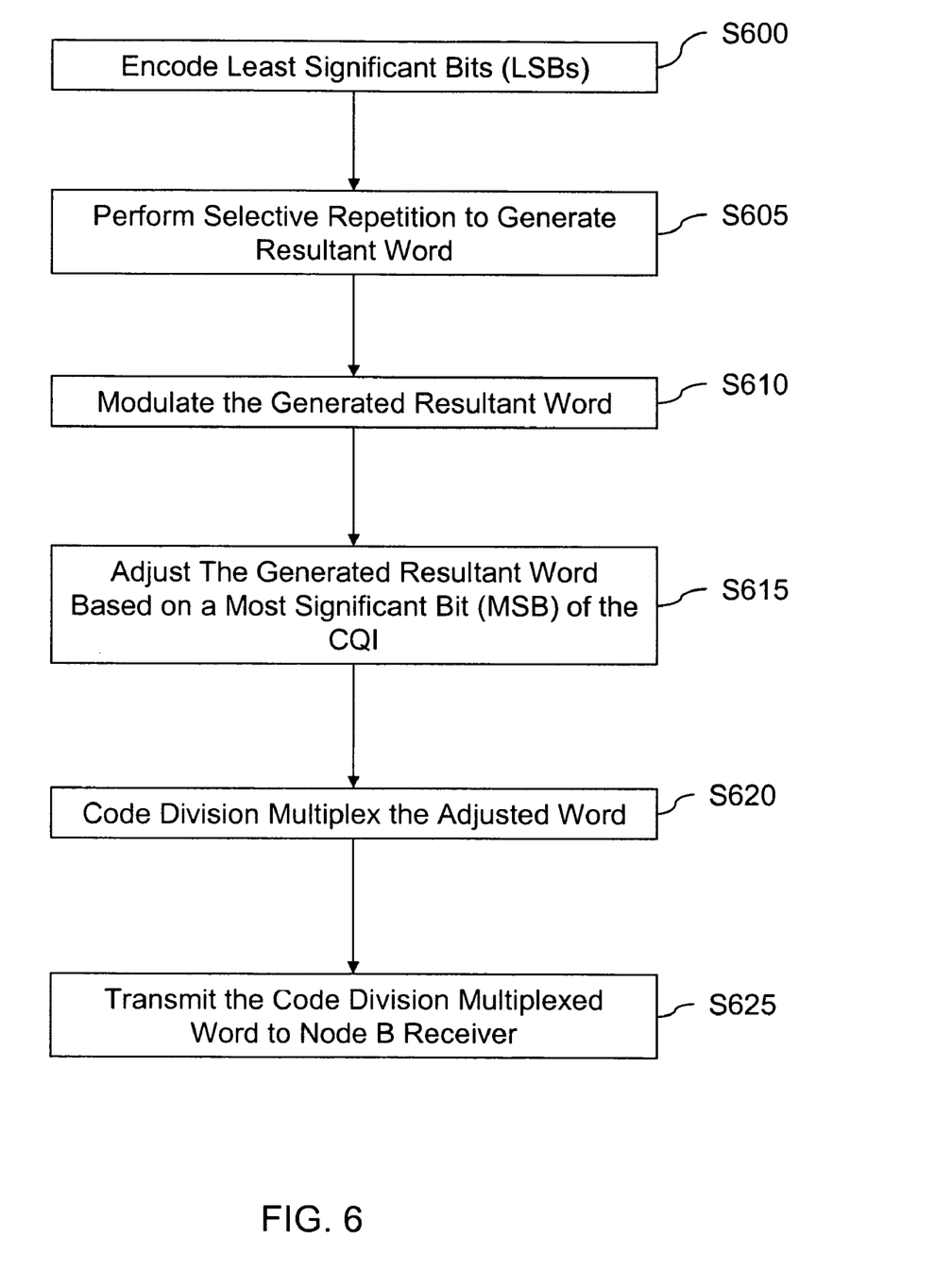
FIG. 6 illustrates a conventional downlink CQI transmission process performed at the user equipment (UE).

FIG. 6 illustrates a conventional downlink CQI transmission process performed at the UE. As used herein, a downlink CQI refers to an indicator of a measured channel quality of a downlink channel. Accordingly, the downlink CQI is transmitted on the uplink (e.g., from a UE to a Node B). Accordingly, the downlink CQI transmission process of FIG. 6 refers to an uplink transmission of a measured downlink CQI.

In step S600 of FIG. 6, at the UE transmitter, the 4 least significant bits (LSBs) of the measured CQI are encoded by a 16-Hadamard code (e.g., encoding the 4 LSBs into a 16-bit word). In an example, the 16-Hadamard encoding may be the same as that used in 3GPP2. One bit in the encoded 16-bit word is selected for repetition, and the selected bit is repeated or copied to produce a 20-bit resultant word in step S605. The resultant 20-bit word is modulated with Binary Phase Shift Keying (BPSK) in step S610. Next, the symbols of the modulated 20-bit word are adjusted based on a most significant bit (MSB) of the 5-bit uncoded CQI in step S615. For example, if the MSB of the 5-bit uncoded CQI is "0", the symbols of the modulated 20-bit word are not adjusted. Alternatively, if the MSB of the 5-bit uncoded CQI is "1", each symbol within the modulated 20-bit word is "flipped" (i.e., "0" becomes "1", "1" becomes "0", etc.). The adjusted symbols are then code division multiplexed (CDM-ed) within the HS-DPCCH (e.g., which includes an ACK) in step S620, and the CDM-ed symbols or word is transmitted to the Node B receiver in step S625.

Figure 7:
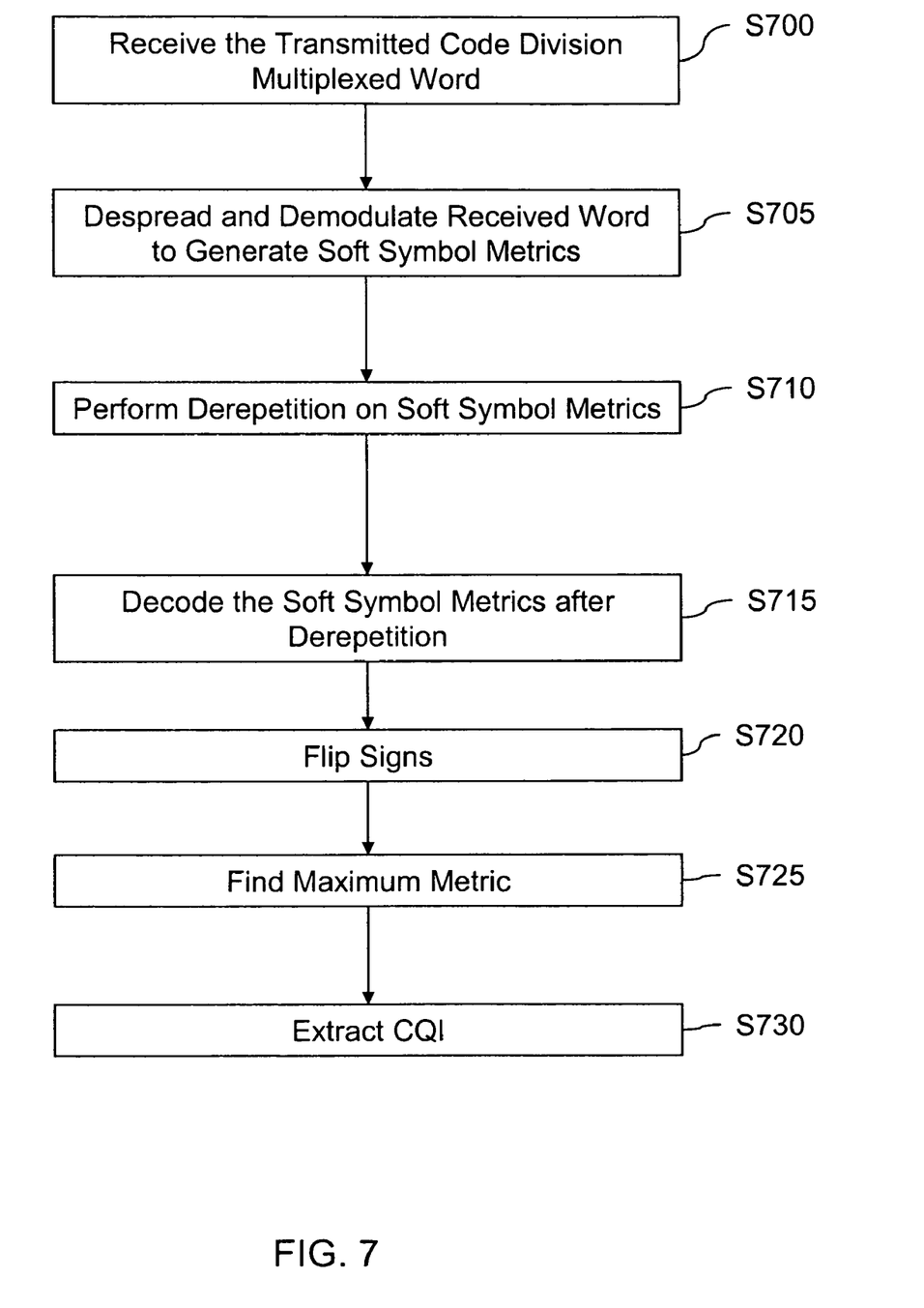
FIG. 7 illustrates a conventional downlink CQI reception process performed at a Node B receiver.

FIG. 7 illustrates a conventional downlink CQI reception process performed at the Node B receiver. In step S700 of FIG. 7, the Node B receiver receives the transmitted CDM-ed word (from S625 of FIG. 6). The received CDM-ed word, with the correct timing information on a HS-DPCCH sub-frame boundary, is despread and demodulated to produce soft symbol metrics in step S705. Next, de-repetition is performed by accumulating the soft symbol metric of the 5 symbols, which represent the same bit in step S710. In other words, step S710 reverses, at the Node B receiver, the repetition step S605 of FIG. 6. After the derepetition, a 16-point fast Hadamard transform is performed to identify the soft symbol metric related to each of the 16 indexes or bits with no sign flip or adjustment in step S715. The resultant metrics after step S715 are stored in a vector with indexes [0, . . . , 15]. The signs of each of the 16 indexes are then "flipped" in step S720 (i.e., "0" becomes "1", "1" becomes "0", etc.) to form a vector with 32 entries where the first 16 entries are the result of the step S715 and the next 16 entries are the same entries but with a sign change. The maximum of the 32 metrics is then determined in step S725. The associated index of the maximum metric is extracted or output as the 5-bit decoded CQI word in step S730. Accordingly, in the above-described manner, a measured CQI at a UE is transferred to a Node B.

Conventional HS-DPCCH Timing Structure at UE

Figure 8:
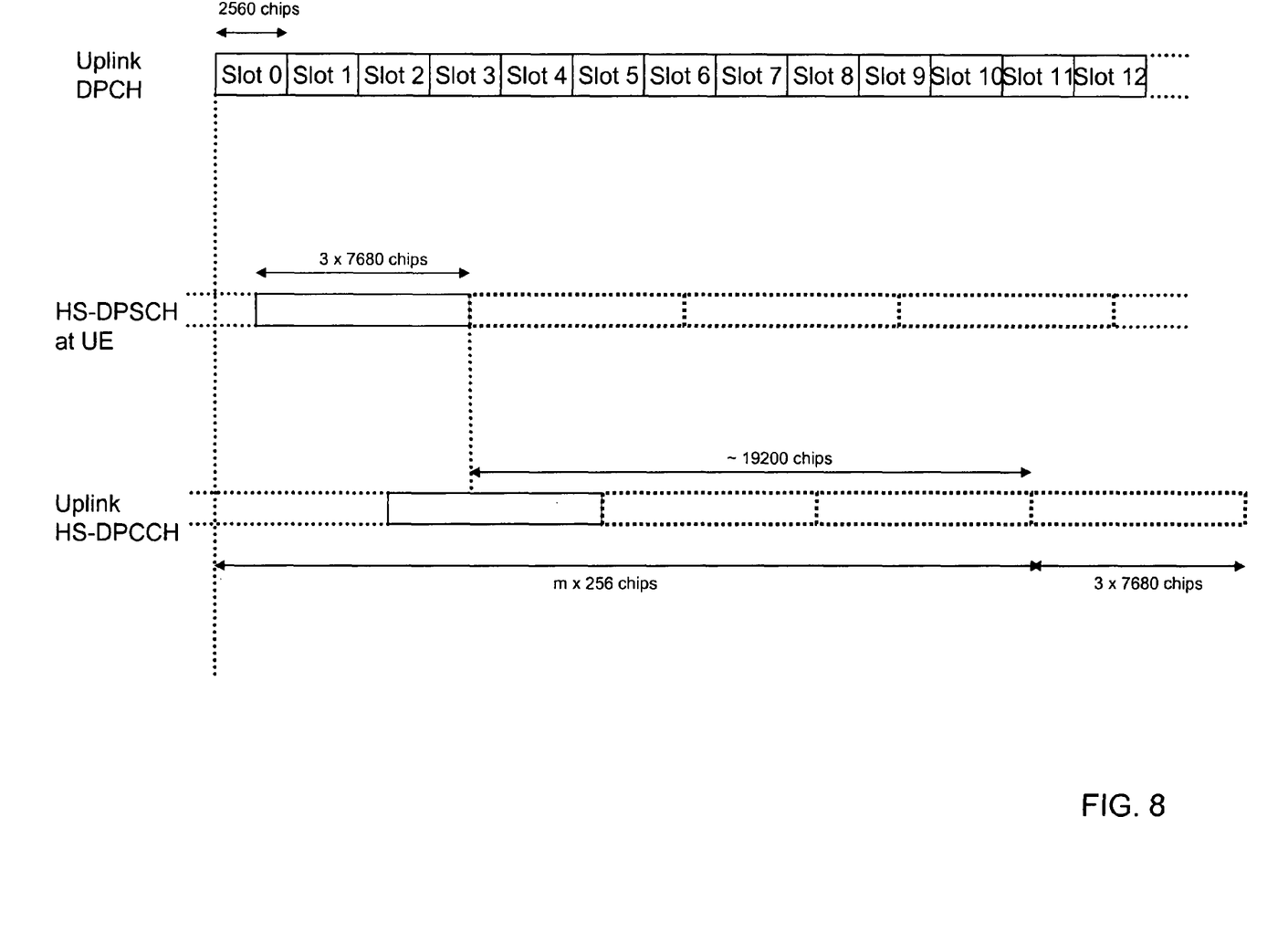
FIG. 8 illustrates a conventional timing structure at the UE for HS-DPCCH control signaling.

FIG. 8 illustrates a conventional timing structure at the UE for HS-DPCCH control signaling. As shown in FIG. 8, the HS-DPCCH sub-frame starts m×256 chips (i.e., the "HS-DPCCH offset") after the start of an uplink DPDCH frame, corresponding to the downlink DPDCH frame from the High Speed Downlink Shared Channel (HS-DSCH), which contains the beginning of the related HS-PDSCH. In FIG. 8, m may be calculated by the following:

$$m = (T_{TX\_diff}/256) + 101 \qquad \text{Equation 1}$$

where $T_{TX\_diff}$ is the difference in chips (e.g., 0, 256, . . . , 38144) between (i) the transmit timing of the start of the related HS-DPSCH subframe and (ii) the transmit timing of the start of the downlink DPCH or F-DPCH frame from the HS-DSCH serving cell containing the beginning of the HS-DPSCH subframe.

Referring to FIG. 8, if the UE is engaged in a handoff on HSDPA (e.g., the UE is switching from a first HS-DSCH serving cell to a second HS-DSCH serving cell in its active set), "m" will transition to a new value based on a timing of the handoff, or "change commit time", as instructed by a higher layer (e.g., a higher layer network element). Accordingly, the "HS-DPCCH offset" may be defined in terms of m, such that, during a handoff, a UE switches from a first HS-DPCCH offset or first value of m to a second HS-DPCCH offset or second value of m.

Conventional CQI Detection During Handoff Interruption Time

As can be inferred from the conventional Figures relating to CQI reporting, in order to recover the reported downlink CQI at the Node B, the HS-DPCCH offset (e.g., a chip offset between uplink HS-DPCCH and a downlink HS-PDSCH received at the UE, as defined above) upon which the UE is transmitting is required at the Node B. Conventionally, the HS-DPCCH timing, or offset, is provided from a higher level node or network element (e.g., the RNC) to both the Node B and the UE.

However, because the UE is a mobile device, as the UE moves between cells, the UE is handed off from a first HSDPA serving cell or Node B ("currently serving Node B") to a second HSDPA serving cell or Node B ("next serving Node B"). Each HSDPA serving cell has a different HS-PDSCH timing or offset (e.g., a different value of "m" as discussed above in greater detail), such that when a UE undergoes handoff, the next serving Node B needs to be informed of the new HS-DPCCH offset (e.g., to correctly monitor transmissions from the UE on the HS-DPCCH), and may need information related to precisely when the new HS-DPCCH offset becomes effective (i.e., the "change commit time"). As discussed above, the HS-DPCCH offset is the chip difference or interval between the HS-PDSCH received at the UE on the downlink (i.e., from a Node B) and the uplink HS-DPCCH transmitted by the UE.

In an ideal scenario, the UE and the next serving Node B switch to the new HS-DPSCH timing or offset at the same time, such that CQI detection is performed seamlessly without interruption. In real-world scenarios, however, 3GPP standards allow the UE a handoff interruption time, such that the UE waits N milliseconds (ms) after the "change commit time" to switch to the new HS-PDSCH timing or offset. N is not specified by 3GPP standards, but rather is determined separately by each vendor. Generally, handoff interruption times range between 30 ms and 100 ms.

During the handoff interruption time, the UE remains synchronized with the "old" HS-DPCCH offset. Alternatively, the UE transmits without conforming to any particular HS-DPCCH offset. In yet another alternative example, the UE simply waits the allocated N ms and transmits nothing during the handoff interruption time. Because the Node B switches to the new HS-DPCCH offset at the actual change commit time (e.g., without waiting the N ms), any CQI words decoded during the handoff interruption time are essentially meaningless. Accordingly, using any CQI words decoded during the handoff interruption time may degrade performance between the next serving Node B and the UE (e.g., because the resolved CQI words at the Node B receiver during the handoff interruption time may not accurately reflect the channel quality actually being measured at the UE).

Conventionally, the higher layer notifies the next serving Node B to ignore any CQI reports during the handoff interruption time, which is defined as M ms after the change commit time. M is typically set to a higher value than N to accommodate for a "worst case scenario" of the interruption handoff time (e.g., 100 ms, 150 ms, etc.). As will be appreciated, if M is set too high, system performance may be degraded because the next serving Node B waits too long before serving the UE.

CQI Detection for Handoff Interruption Time

An example embodiment of the present invention directed to actively detecting a UE's change commit time (e.g., when a UE stops communicating in accordance with a current serving Node B's HS-DPCCH offset and starts communicating in accordance with a next serving Node B's HS-DPCCH offset) will now be described in greater detail.

While example embodiments of the present invention are described below with respect to a handoff from a current serving Node B to a next serving Node B, it is understood that other example embodiments may be directed to any inter-cell handoff. Thus, another example embodiment of the present invention may be directed to operations during a handoff from a first cell of a Node B to a second cell of the same Node B, and as such example embodiments of the present invention need not be limited to handoffs between cells of different Node Bs.

Figure 9:
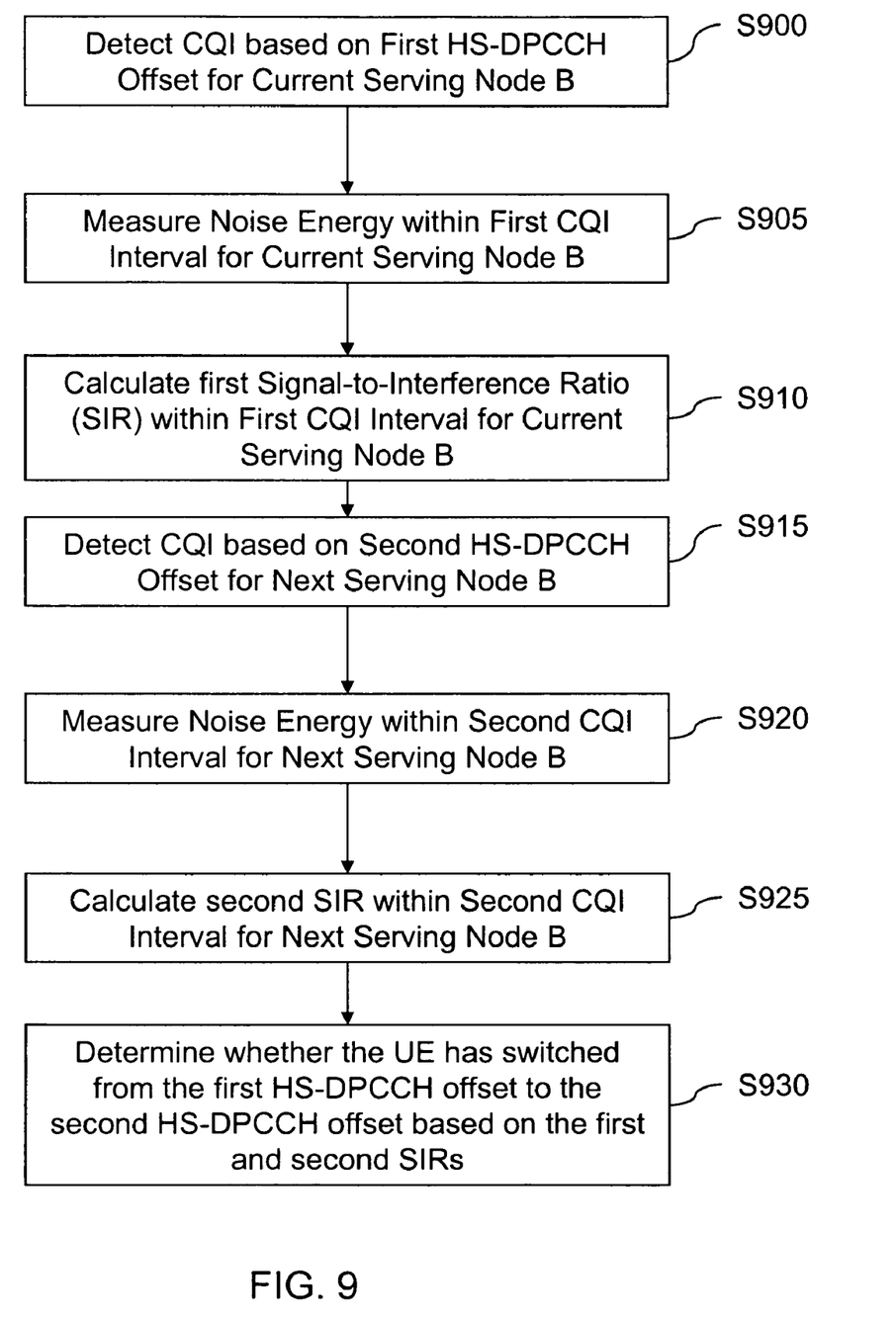
FIG. 9 illustrates a process of detecting when a UE changes its HS-DPCCH offset during a handoff from a current serving Node B to a next serving Node B according to an example embodiment of the present invention.

FIG. 9 illustrates a process of detecting when a UE changes its HS-DPCCH offset during a handoff from a current serving Node B to a next serving Node B according to an example embodiment of the present invention. The process of FIG. 9 is performed at the next serving Node B to which the UE is being handed off. While the description below refers to a "current serving Node B" and a "next serving Node B", it is understood that, within the context of a handoff, these structures may alternatively be referred to as a "transferor serving station" and a "transferee serving station" in the sense that the UE is being transferred from the transferor serving station to the transferee serving station.

In the example embodiment of FIG. 9, in step S900, the Node B receiver for the next serving Node B attempts to detect the CQI from the UE with a first HS-DPCCH offset using conventional methodologies. The first HS-DPCCH offset is the HS-DPCCH offset upon which the current serving Node B is calibrated. In other words, step S900 "listens in" on the UE's CQI transmissions prior to the change commit time, or prior to when the UE switches to a second HS-DPCCH offset for the next serving Node B during the handoff. In an example, step S900 is an iteration of the process of FIG. 7 (except step S730 is not performed). Accordingly, step S900 outputs the maximum metric as determined in step S725 of FIG. 7.

In step S905, the Node B receiver for the next serving Node B measures noise energy within a first CQI interval for the expected CQI from the UE calibrated to the first HS-DPCCH offset. In other words, the Node B receiver measures the energy level in the spectrum where the UE is expected to transmit the CQI before the change commit time (e.g., before the UE switches to the second HS-DPCCH of the next serving Node B from the first HS-DPCCH offset of the current serving Node B).

In step S910, the Node B calculates a first signal-to-interference ratio (SIR) based on the measured signal energy from step S900 and the measured noise energy from step S905

In the example embodiment of FIG. 9, in step S915, the Node B receiver for the next serving Node B attempts to detect the CQI from the UE with the second HS-DPCCH. The second HS-DPCCH offset is the HS-DPCCH offset upon which the next serving Node B is calibrated. In an example, step S915 may be performed similarly to an iteration of the process of FIG. 7 (except step S730 is not performed). Accordingly, step S915 outputs the maximum metric as determined in step S725 of FIG. 7.

In step S920, the Node B receiver for the next serving Node B measures noise energy within a second CQI interval for the expected CQI from the UE calibrated to the second HS-DPCCH offset. In other words, the Node B receiver measures the energy level in the spectrum where the UE is expected to transmit the CQI after the change commit time (e.g., after the UE switches to the second HS-DPCCH of the next serving Node B from the first HS-DPCCH offset of the current serving Node B).

In step S925, the Node B calculates a second signal-to-interference ratio (SIR) based on the measured noise energy from step S920.

Once the first and second SIRs have been measured and both maximum metrics have been determined, the process advances to step S930. In step S930, the next serving Node B determines whether the UE has switched from the first HS- DPCCH offset to the second HS-DPCCH offset based on the first and second SIRS. Step S930 will now be described in greater detail with respect to the example embodiment of FIG. 10.

Figure 10:
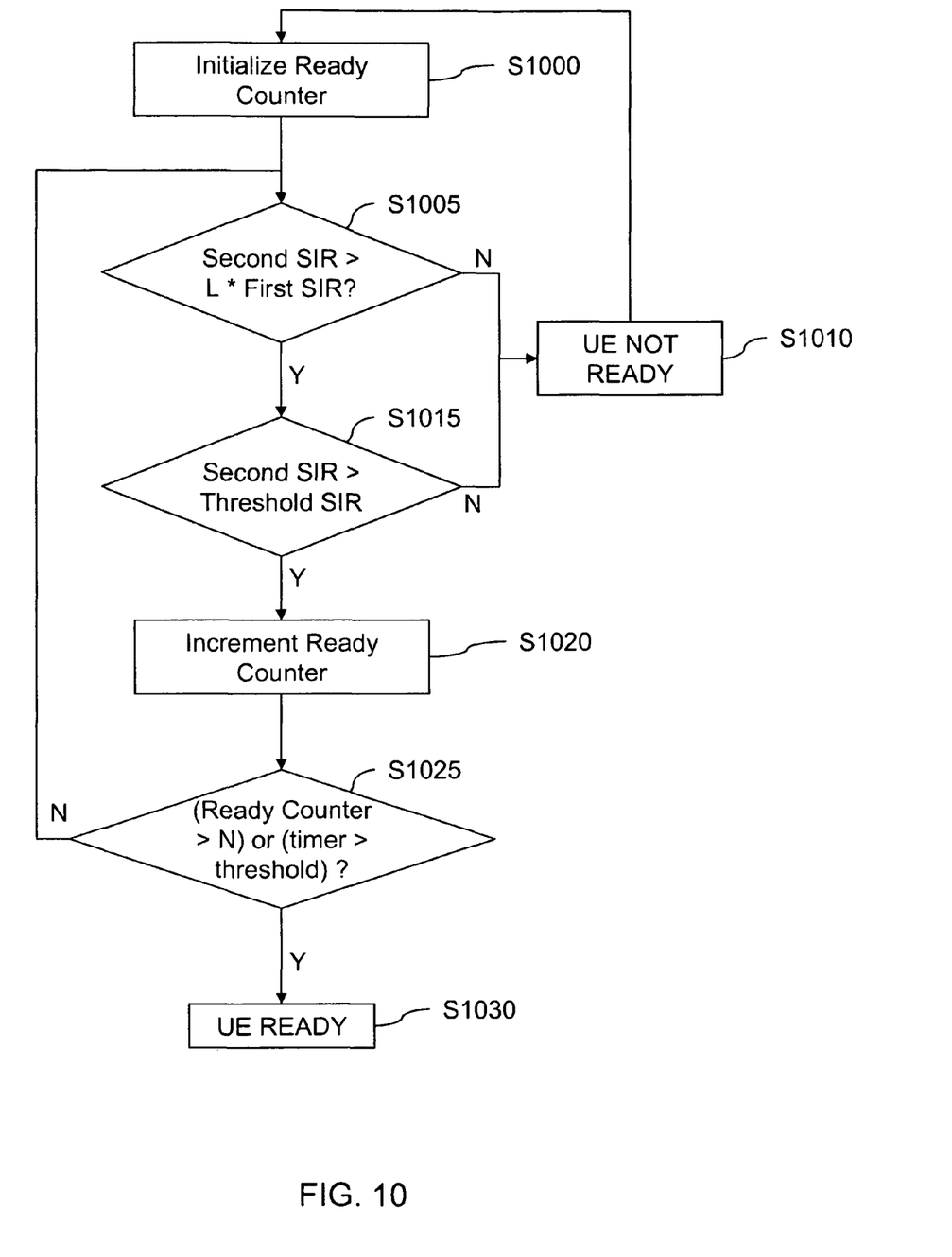
FIG. 10 illustrates a process of detecting a UE HS-DPCCH offset transition based on calculated SIR values during a handoff according to an example embodiment of the present invention.

FIG. 10 illustrates a process of detecting a UE HS-DPCCH offset transition based on calculated SIR values during a handoff according to an example embodiment of the present invention. The process of FIG. 10 may be performed within step S930 of FIG. 9 as described above.

In the example embodiment of FIG. 10, in step S1000, a Ready Counter is initialized to zero. Next, in step S1005, the next serving Node B determines whether the calculated second SIR (e.g., from step S925 of FIG. 9) is greater than L times the calculated first SIR (e.g., from step S910 of FIG. 9). In an example, L is a positive, real number (e.g., a natural number, a rational number, etc.) based on one or more of a number of factors which may potentially affect handoff, including but not limited to a CQI repetition factor, a CQI reporting cycle or interval, $\beta_{hs}/\beta_c$, etc. For example, the L parameter may be chosen to achieve a desired probability of "false positives" (e.g., a probability of incorrectly determining that the UE has switched to the next cell or next serving Node B). Thus, the L parameter may be an empirically determined value based on this type of criteria.

If step S1005 determines that the calculated second SIR is not greater than L times the calculated first SIR, the process advances to step S1010. In step S1010, the next serving Node B sets a UE status indicator to "UE NOT READY", and the process returns to step S1000 where the Ready Counter is initialized again. As will be appreciated in view of the description below, the process of FIG. 10 continues until the UE status indicator equals "UE READY", at which point the handoff to the next serving Node B has been made and the UE uses the HS-DPCCH offset for the next serving Node B.

Otherwise, if step S1005 determines that the calculated second SIR is greater than L times the calculated second SIR, the process advances to step S1015. In step S1015, the next serving Node B determines whether the calculated second SIR is greater than a threshold SIR. In an example, the threshold SIR is a value empirically determined by a system designer (e.g., based upon a study of real-world SIR values for CQI energy during hand-offs). If step S1015 determines that the calculated second SIR is not greater than the threshold SIR, the process advances to step S1010, which is described above. Otherwise, the process advances to step S1020, where the next serving Node B increments the Ready Counter (e.g., by one). In step S1025, the next serving Node B determines whether either (i) Ready Counter is greater than a consecutive subframe threshold S (e.g., determined by a system designer based upon a study of consecutive subframes and energy levels during hand-offs) or (ii) a timer maintaining a duration of the process of FIG. 10 with an expiration time equal to the maximum handoff interruption time, which is defined as M ms after the change commit time, has expired. If step S1025 determines that either of conditions (i) or (ii) are satisfied, the process advances to step S1030, where the UE status indicator is set to "UE READY". Otherwise, if neither of conditions (i) or (ii) are met, the process returns to step S1005.

With respect to the example embodiments of FIGS. 9 and 10, it will be appreciated that step S915 of FIG. 9 is typically performed by the conventional art, whereas the additional steps of S900, S905, S910, S920, S925 and S930 are exclusive to example embodiments of the present invention. Further, the steps of S900, S905, S910, S920, S925 and S930 may be configured to be performed only during a handoff scenario for the UE. Thus, if a handoff of a given UE is not being performed, the next serving Node B may act in accordance with the conventional art by performing only step S915 to maintain the UE on the second HS-DPCCH offset, as described above with respect to conventional FIG. 7.

In view of the example embodiments of FIGS. 9 and 10, it will be appreciated that a comparison of noise levels between expected CQI intervals with different HS-DPCCH offsets may indicate whether a given UE has switched its operation to a new HS-DPCCH offset. Accordingly, instead of simply waiting M ms after the change commit time, a next serving Node B, or transferee Node B, may actively detect when the UE switches to its HS-DPCCH offset, thereby reducing handoff interruption time and increasing system performance.

The example embodiments of the present invention being thus described, it will be obvious that the same may be varied in many ways. For example, while example embodiments of the present invention have been described with respect to 3GPP-UMTS, it is understood that other example embodiments of the present invention may employ other UMTS protocols, CDMA2000 protocols, and/or any other well-known wireless communication protocol.

For example, while example embodiments of the present invention are described above with respect to a handoff from a current serving Node B to a next serving Node B, it is understood that other example embodiments may be directed to any inter-cell handoff. Thus, another example embodiment of the present invention may be directed to operations during a handoff from a first cell of a Node B to a second cell of the same Node B, and as such example embodiments of the present invention need not be limited to handoffs between cells of different Node Bs.

Such variations are not to be regarded as a departure from the spirit and scope of the exemplary embodiments of the invention, and all such modifications as would be obvious to one skilled in the art are intended to be included within the scope of the invention.

We claim:

1. A method of determining handoff of a user equipment (UE) to a transferee serving station from a transferor serving station at the transferee serving station, comprising:
    first measuring an energy level in a first portion of an uplink channel, the first portion of the uplink channel associated with the transferee serving station;
    second measuring an energy level in a second portion of the uplink channel, the second portion of the uplink channel associated with the transferor serving station; and
    determining a time when the UE has handed off to the transferee serving station based upon the first and second measured energy levels.

2. The method of claim 1, wherein the uplink channel is an uplink high-speed dedicated physical control channel (HS-DPCCH).

3. The method of claim 2, wherein the first portion of the HS-DPCCH is a first subframe at a first HS-DPCCH offset and the second portion of the HS-DPCCH is a second subframe at a second HS-DPCCH offset.

4. The method of claim 3, wherein the first HS-DPCCH offset is a chip offset between the start of the UE's HS-DPCCH sub-frame for the transferee serving station and an uplink dedicated physical data channel (DPDCH) frame containing the beginning of an associated high speed physical downlink shared channel (HS-PDSCH) frame.

5. The method of claim 4, wherein the first portion of the uplink channel is where a channel quality indicator (CQI) is expected to be reported from the UE for the transferee serving station based on the first HS-DPCCH offset and the second portion of uplink channel is where a CQI is expected to be reported from the UE for the transferor serving station based on the second HS-DPCCH offset.

6. The method of claim 3, wherein the second HS-DPCCH offset is a chip offset between the start of the UE's HS-DPCCH sub-frame for the transferor serving station and an uplink dedicated physical data channel (DPDCH) frame containing the beginning of an associated high speed physical downlink shared channel (HS-PDSCH) frame.

7. The method of claim 6, wherein the first portion of the uplink channel is where a channel quality indicator (CQI) is expected to be reported from the UE for the transferee serving station based on the first HS-DPCCH offset and the second portion of uplink channel is where a CQI is expected to be reported from the UE for the transferor serving station based on the second HS-DPCCH offset.

8. The method of claim 1, wherein the first measuring step, the second measuring step and the determining step are performed during a handoff interruption period of a handoff of the UE.

9. The method of claim 1, wherein the transferor and transferee serving stations are a same serving station.

10. The method of claim 9, wherein the determining step determines when the UE has handed off from a first cell of the transferee serving station to a second cell of the transferee serving station.

11. The method of claim 1, wherein the transferor and transferee serving stations are different serving stations.

12. The method of claim 1, wherein the determining step includes:
  comparing the first measured energy level with a given parameter times the second measured energy level; and
  determining the UE to have handed off to the transferee serving station if the comparison indicates that the first measured energy level is greater than the given parameter times the second measured energy level.

13. The method of claim 1, wherein the determining step includes:
  comparing the first measured energy level with a given parameter times the second measured energy level; and
  determining the UE not to have handed off to the transferee serving station if the comparison indicates that the first measured energy level is not greater than the given parameter times the second measured energy level.

14. The method of claim 1, wherein the determining step further includes:
  first comparing the first measured energy level with a given parameter times the second measured energy level;
  repeating the first comparison step N times, wherein N is an integer greater than or equal to 1; and
  second comparing a number of consecutive times the first comparison step indicates that the first measured energy level is greater than the given parameter times the second measured energy level with a consecutive subframe threshold.

15. The method of claim 14, wherein the determining step further includes:
  determining the UE to have handed off to the transferee serving station if the second comparison indicates that the number of consecutive times is greater than the consecutive subframe threshold or a given handoff interruption timer has expired.

16. The method of claim 15, wherein the given handoff interruption timer expires after a time period corresponding to a worst case scenario of a handoff interruption time for the UE.

17. The method of claim 14, wherein the determining step further includes:
  determining the UE not to have handed off to the transferee serving station if either the second comparison indicates that the number of consecutive times is not greater than the consecutive subframe threshold and a given handoff interruption timer has not expired.

18. The method of claim 17, wherein the given handoff interruption timer expires after a time period corresponding to a worst case scenario of a handoff interruption time for the UE.

19. The method of claim 1, wherein the first portion of the uplink channel is where a channel quality indicator (CQI) is expected to be reported from the UE for the transferee serving station and the second portion of uplink channel is where a CQI is expected to be reported from the UE for the transferor serving station.

20. The method of claim 1, wherein a sequence of performing the first and second measuring steps is one of (i) performing the first measuring step before the second measuring step and (ii) performing the first measuring step after the second measuring step.

* * * * *